United States Patent Office 3,330,385
Patented July 11, 1967

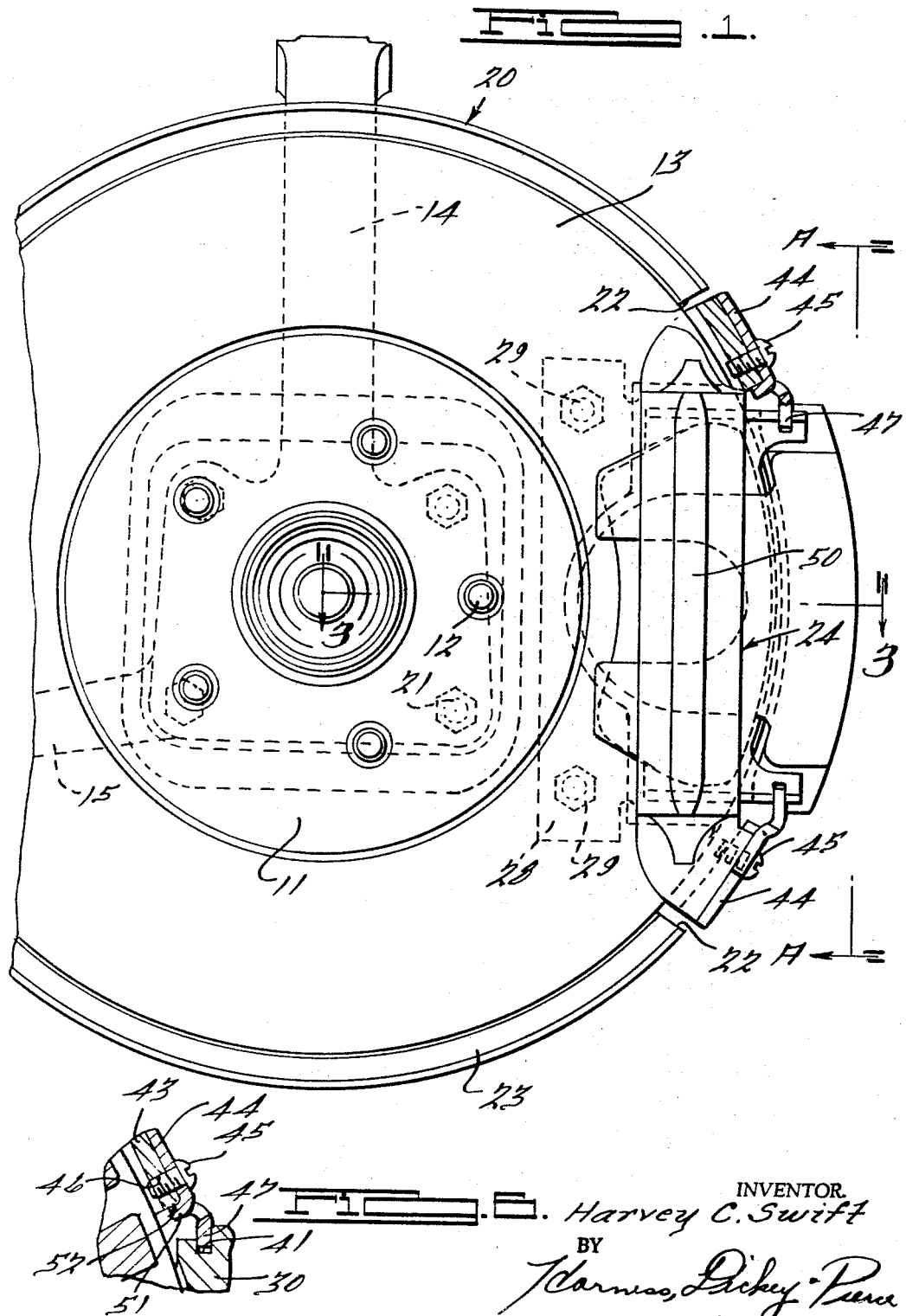

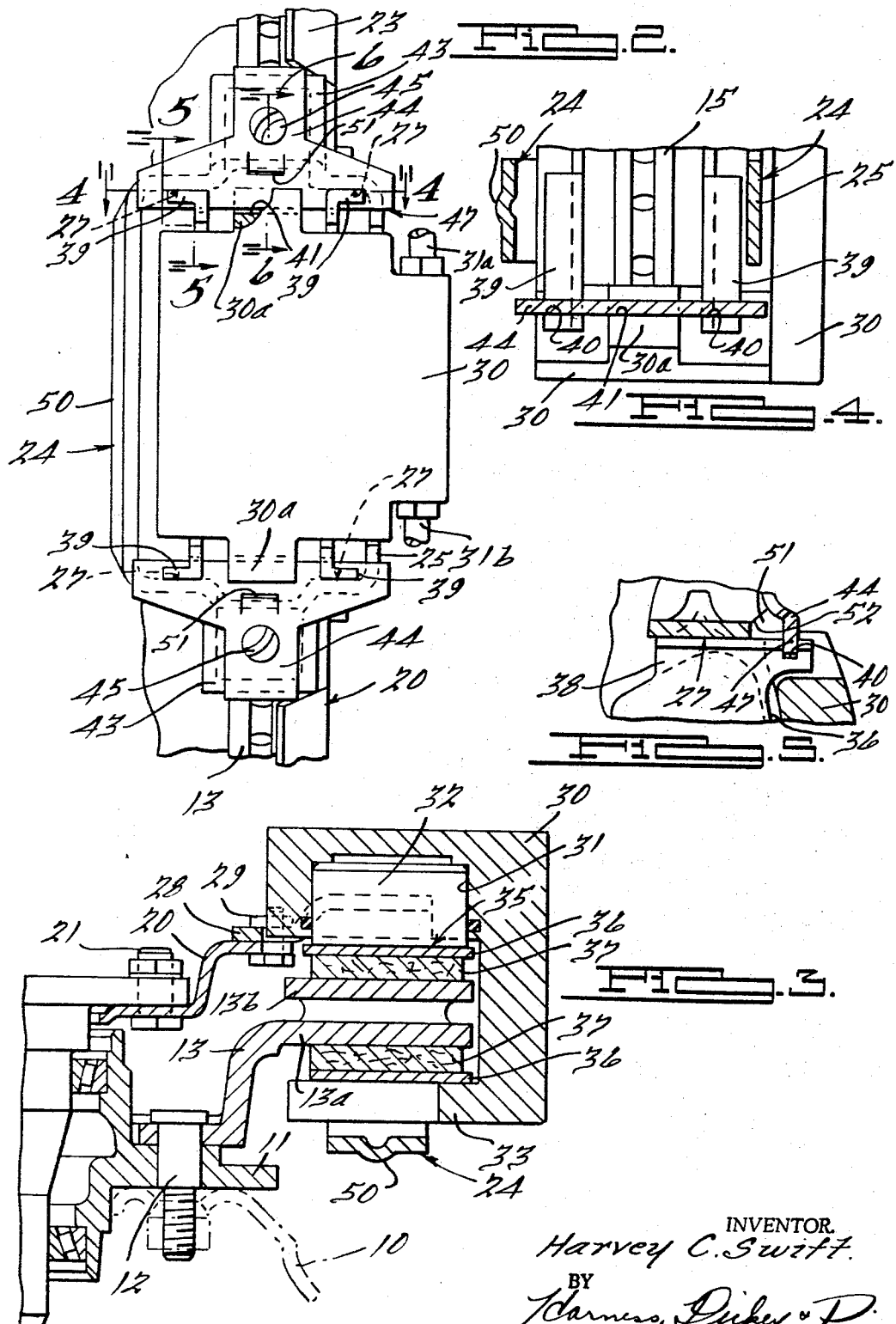

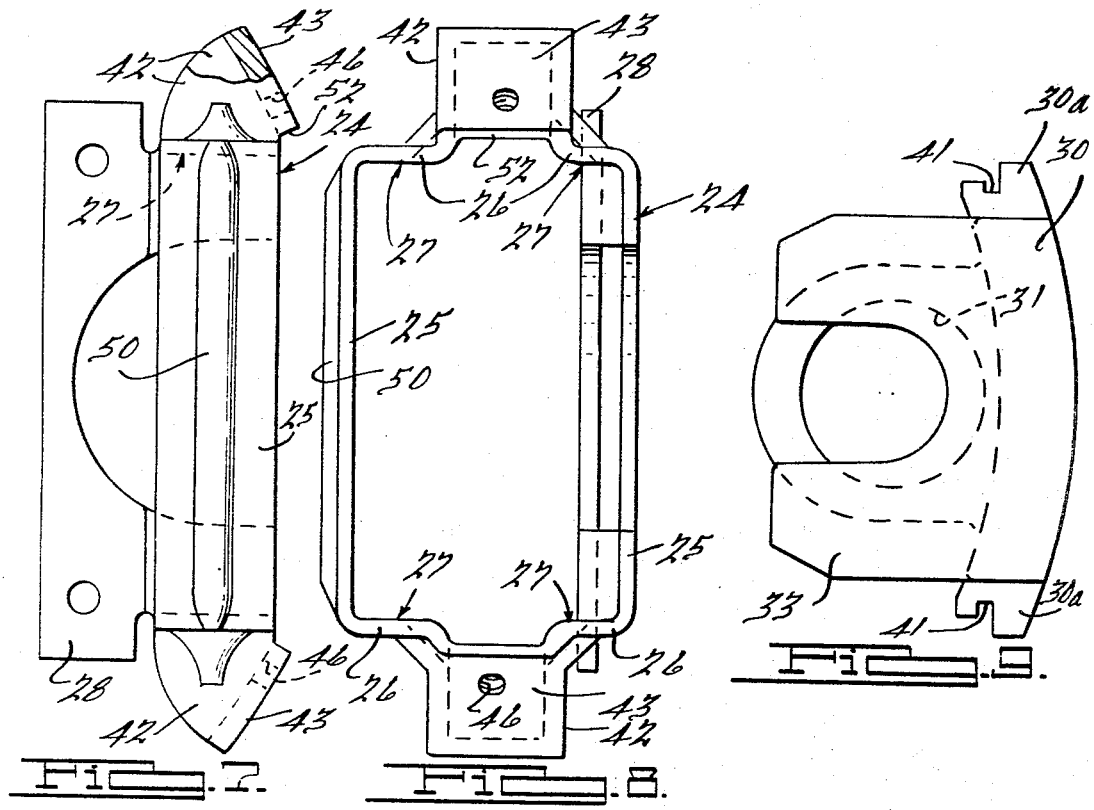
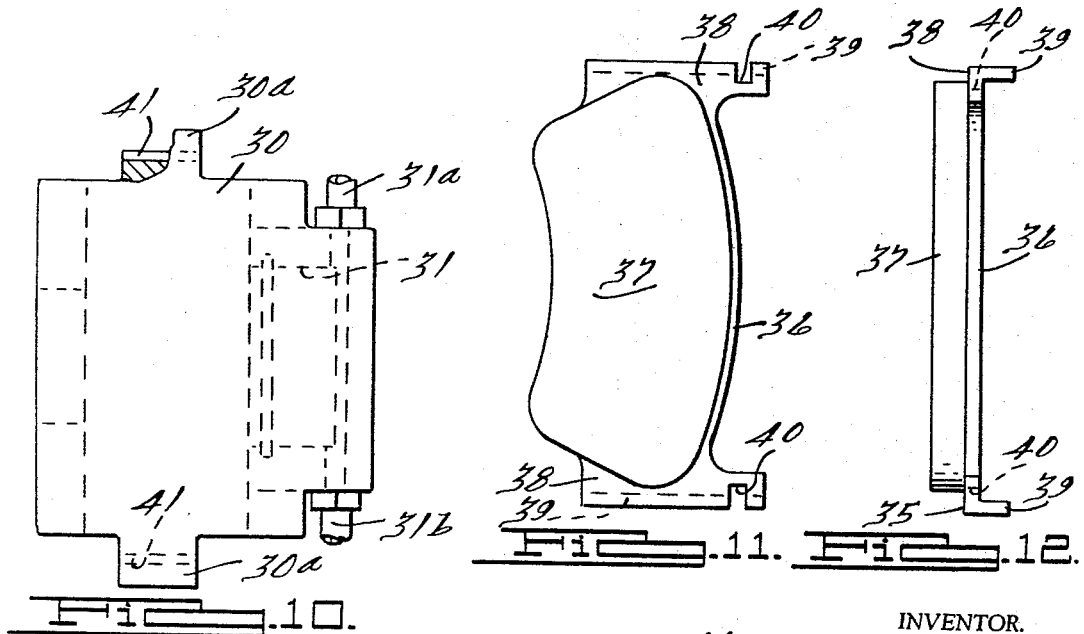

3,330,385
SPOT-TYPE DISK BRAKE AND SUPPORT MEANS
Harvey C. Swift, Birmingham, Mich., assignor to Kelsey-Hayes Company, Romulus, Mich., a corporation of Delaware
Filed June 15, 1965, Ser. No. 464,060
3 Claims. (Cl. 188—73)

This invention relates to wheel brakes for vehicles and, more particularly, to improvements in disk brakes adapted to simplify the same whereby they may be economically manufactured, easily assembled and disassembled, and improved generally.

One of the principal objects of the invention is to provide a brake structure which is distinguished by the use of a minimum number of parts in which the main torque member constitutes the backing plate and also the dust shield of the brake. A torque conveying member in the form of a spider or yoke is attached to this backing plate; a caliper-like cylinder casting is mounted on the spider; two brake shoes are mounted on the spider; and two guide and retaining members are attached to the spider to slidably connect the cylinder casting or caliper and the brake shoes to the spider. Thus, a construction is provided which is so reduced in the number and character of its component parts as to approach the ultimate in structural simplicity to thereby create an economy in its manufacture, installation and maintenance costs.

One of the important objects of this invention is to provide a brake in which only the cylinder casting and piston are machined, the rest of the parts being made from sheet metal, thus materially reducing the cost of production.

It is also an object of the invention to provide a construction in which the main torque member serves as the backing plate and dust shield of the brake.

Another object of this invention is to provide a structure in which the caliper or cylinder casting and the brake shoes are supported and guided by the same guides.

A further object is to provide a construction in which the torque taken from the brake shoes and the brake applying forces taken from the caliper are separated from one another.

A still further object is to provide a construction in which the cylinder and shoes are easily removed so that maintenance of the brake is facilitated.

Other objects of the invention are to provide a construction which is strong and rugged; operates smoothly and efficiently; and is otherwise commercially practical.

The various objects and advantages, and the novel details of construction of one commercially practical embodiment of the invention will become more apparent as this description proceeds, especially when considered in connection with the accompanying drawings, in which:

FIGURE 1 is an elevational view of a brake constructed in accordance with this invention;

FIGURE 2 is an elevational view looking in the direction of the arrows A in FIGURE 1;

FIGURE 3 is an enlarged fragmentary sectional view taken substantially on the plane indicated by line 3—3 in FIGURE 1;

FIGURE 4 is a fragmentary detail sectional view taken on line 4—4 in FIGURE 2;

FIGURE 5 is a fragmentary detail sectional view taken on line 5—5 in FIGURE 2;

FIGURE 6 is a fragmentary detail sectional view taken on line 6—6 in FIGURE 2;

FIGURE 7 is a side elevational view of the spider or yoke member which is attached to the backing plate to transmit the torque thereto;

FIGURE 8 is a plan view of the spider or yoke member;

FIGURE 9 is an elevational view of the caliper member or cylinder casting;

FIGURE 10 is a plan view of the caliper member or cylinder casting;

FIGURE 11 is a plan view of one of the brake shoes; and

FIGURE 12 is an edge elevation of the brake shoe shown in FIGURE 11.

The present invention is shown as being associated with a vehicle wheel having a wheel body 10, shown by dotted lines in FIGURE 3, secured to the axle flange 11 by means of studs or bolt and nut assemblies 12.

Also secured to the axle flange 11 by the stud or bolt and nut assemblies 12 is a brake disk 13. The brake disk 13 is of the ventilated type having spaced braking walls 13a and 13b.

If the wheel to which the brake is applied is the front steering wheel of the vehicle, it is provided with at least one arm 14 forming a part of the pivotal mounting of the wheel, and a second arm 15 connected to the steering linkage (not shown).

As shown in FIGURES 1 and 2, the wheel is provided with a backing plate 20 which is nonrotatably secured to a nonrotatable portion of the axle structure by means of bolts and nuts 21. This backing plate 20 also serves as a dust shield. It is cut away as shown at 22 to receive the braking mechanism (see FIGURE 1) and is provided with an annular flange 23 (see FIGURES 1 and 2).

The backing plate 20 serves as a torque member and for this purpose has secured thereto a spider or yoke member 24; see FIGURES 1, 2, 7 and 8. As shown best in FIGURES 7 and 8, the spider or yoke member 24 is in the form of a substantially rectangular sheet metal frame having a pair of spaced longitudinally extending side portions 25 connected by transversely extending end portions 26. The end portions 26 provide bearing surfaces 27 against which the ends of the backing plates of the brake shoes (yet to be referred to) abut. The yoke or spider 24 is formed with a longitudinally extending flange 28 by means of which the spider member is secured to the backing plate 20 by means of bolts or the like 29.

The reference character 30 indicates a caliper member or cylinder casting arranged substantially within the yoke or spider 24. This part 30 may be conveniently formed of cast metal and constitutes a force transmitting member or clamp for operating the brakes. This member 30 is provided with a recess 31 forming a cylinder to slidably receive a piston 32. The leg 33 of the member 30 engages the brake shoe 34; whereas, the piston 32 engages the opposed brake shoe 35. When fluid is admitted under pressure to the cylinder 31 behind the piston 32, the piston is actuated to move the brake shoe 35 toward the brake disk 15. The reaction of this movement of the piston operates in the opposite direction to move the member 30, so that the leg 33 thereof moves the other brake shoe 34 into engagement with the brake disk. Thus, both brake shoes are actuated simultaneously by the use of a single piston. Fluid under pressure is admitted to cylinder 31 through inlet 31a and a bleed outlet is shown at 31b.

Each brake shoe consists of a backing plate 36 carrying a friction lining 37. The backing plate 36 of each of the brake shoes is provided at its opposite ends with extensions 38 provided with laterally extending flanges 39. These flanges and extensions are provided with transversely extending slots 40. The ends 30a of the center portion of the caliper or cylinder casting 30 are also provided with transversely extending slots 41; see FIGURES 9 and 10.

The ends of the yoke or spider member 24 are provided with curved or rounded portions 42 which terminate in angularly disposed faces 43. Secured to each angularly disposed face 43 of the spider or yoke member is a bracket or saddle-like member 44 which constitutes a shoe guide and retaining member. Each bracket is secured by a screw or the like 45 which threadedly engages an opening 46 (see FIGURES 1 and 6) in the face 43 of the rounded portion 42. Each bracket 44 has a transverse angularly extending edge portion 47 which slidably engages the slot 40 in the adjacent end of the backing plate, as shown in FIGURE 5, and also engages the slot 41 in the casting, as shown in FIGURE 6.

As shown, there is a bracket 44 at each end of the structure, so that the brake shoes may move laterally when the brake is applied and the caliper or casting 30 is also permitted to move laterally to permit its reaction movement to apply the brake shoe 34.

The flanges 39 on the brake shoes engage the surfaces 27 on the yoke or spider 24 (see FIGURE 2) and the brackets 44 guide the brake shoes in their movement toward and from the brake disk 13. Also, as will be apparent, the torque on the brake shoes is transmitted to the spider 24 through the surfaces 27 and thence from the spider to the backing plate 20. The brake applying forces are taken by the casting 30 and transmitted through the end portions or extensions 30a to the brackets 44 and thence to the yoke 24 and thence to the backing plate. Thus, the torque forces from the brake shoes and brake applying forces on the caliper are separated from one another.

The two brackets 44 act to guide the brake shoes and the caliper member or cylinder casting 30 and to retain the same in place while permitting the required lateral sliding movement of these parts.

As shown in FIGURES 1, 2, 7 and 8, the spider is provided along one longitudinal side thereof with a reinforcing rib 50. For locating each bracket 44 with reference to the end of the spider, each bracket 44 is provided with a slitted portion which is turned down to form a flange 51 which abuts the edge 52 of the face portion 43.

From the foregoing, it will be obvious that all of the major parts of this construction may be made from sheet metal and that it is only necessary to machine the casting 30 and the piston 32. Thus, the device may be economically manufactured. By removing the screws 45, the brackets 44 may be easily removed so that the brake shoes and casting 30 may be readily disassembled and reassembled. Moreover, the brake structure is so reduced in the number and character of its component parts as to approach the ultimate in structural simplicity.

While one commercially practical embodiment of the present invention has been described and illustrated herein somewhat in detail, it will be understood that various changes may be made as may come within the purview of the accompanying claims.

What is claimed is:
1. A disk brake for use with a brake disk secured to the wheel of a vehicle including an axially movable caliper member having a fluid motor portion provided with a cylinder bore and a piston, a portion extending axially over the outer periphery of said disk from said fluid motor portion and a reaction portion extending radially inwardly from said last named portion on the opposite side of said disk from said fluid motor portion; a first brake shoe located between said piston and one side of said disk; a second brake shoe located between said caliper reaction portion and the opposite side of said disk; a sheet metal stationary torque member having a mounting portion secured to a stationary portion of the vehicle, a pair of circumferentially spaced end portions extending axially from said mounting portion over the outer periphery of said disk with said caliper member being located therebetween and a side portion extending chordally of the rotor between said end portions on the opposite side disk from said mounting portion and in axial alignment with said piston and said caliper reaction portion whereby said caliper reaction portion lies between said side portion and said second brake shoe and means on said end portions supporting and guiding said shoes and said caliper member for movement axially of said disk.

2. The structure set forth in claim 1 wherein said last named means include axially extending members which are releasably fastened to said end portions and which register in notches formed in said caliper member and said shoes.

3. The structure set forth in claim 1 including shoulders formed on said end portions engageable with the opposite ends of said shoes and operable to take the braking torque of said shoes.

References Cited

UNITED STATES PATENTS

| 3,081,843 | 3/1963 | Dotto et al. | 188—73 |
| 3,182,754 | 5/1965 | Hahm et al. | 188—73 |
| 3,194,351 | 7/1965 | Swift | 188—73 |
| 3,199,632 | 8/1965 | Chovings | 188—73 |
| 3,251,436 | 5/1966 | Afanador et al. | 188—73 |

FOREIGN PATENTS 984,436   2/1965   Great Britain.

MILTON BUCHLER, *Primary Examiner.*

FERGUS S. MIDDLETON, *Examiner.*

G. E. HALVOSA, *Assistant Examiner.*